United States Patent [19]
Brooks
[11] 3,969,620
[45] July 13, 1976

[54] LANTERN SUPPORT APPARATUS

[76] Inventor: Charles R. Brooks, Rte. 1, White Horse Road, Greenville, S.C. 29611

[22] Filed: June 4, 1975

[21] Appl. No.: 583,762

[52] U.S. Cl. .......... 240/7.5; 240/52 R; 240/57; 248/274; 248/291; 248/309 R
[51] Int. Cl.² .......... F21V 21/14; F16M 11/00
[58] Field of Search .......... 240/7.5, 52.3, 57, 57.1, 240/52 R, 52.1, 11, 38; 248/274, 291, 309, 311

[56] References Cited

UNITED STATES PATENTS

| | | | |
|---|---|---|---|
| 63,820 | 4/1867 | Towne | 240/52.3 |
| 687,348 | 11/1901 | Theobald | 240/57.1 X |
| 1,541,128 | 6/1925 | Ennis | 240/52 R |
| 2,098,996 | 11/1937 | Blake et al. | 248/311 R X |
| 2,508,974 | 5/1950 | Soditch et al. | 248/291 |
| 2,960,601 | 11/1960 | Higgins | 240/52 R X |
| 3,160,383 | 12/1964 | Lamm | 248/311 R X |
| 3,341,163 | 9/1967 | Honig | 240/7.5 X |
| 3,652,049 | 3/1972 | McCown | 240/7.5 X |
| 3,843,082 | 10/1974 | Gorrett | 248/309 X |

*Primary Examiner*—Joseph F. Peters, Jr.
*Attorney, Agent, or Firm*—Bailey & Dority

[57] ABSTRACT

This invention relates generally to a support apparatus for holding a lantern having a pivotable bail handle including a pair of elongated members connected together by a pivot joint one of the members being cantilevered with respect to the other and having a raised medial portion with a plurality of notches formed therein for receiving the bail handle and an elongated transverse member over which the full width of the bail handle bears against. The second of the elongated members is provided with attachment means for attaching the support apparatus to a supporting structure such as the side of a boat or a tree. A lantern so supported is allowed to pivot freely about its bail handle and be maintained in a substantially upright position at all times.

6 Claims, 5 Drawing Figures

LANTERN SUPPORT APPARATUS

BACKGROUND OF THE INVENTION

Heretofore, devices have been developed for supporting lanterns from the sides of boats and other supporting structures such as shown in U.S. Pat. No. 3,652,049 and 3,341,163. However, these devices provide for supporting a lantern in a tilted position which does not allow for a complete burning of the fuel in the fuel tank of the lantern. These prior devices, while supporting the lantern at the handle and the base, permit the lantern to rock with the boat as well as permitting the lantern to swing laterally.

Another prior device for supporting a lantern in a more rigid manner is shown in U.S. Pat. No. 2,960,601 wherein a lantern is supported at its base and at its handle so as to prevent any swinging of the lantern. However, since the lantern is rigidly supported and attached to a side of a boat, the lantern will follow the rocking movement of the boat continuously changing that surface of the water which is illuminated.

By using an elongated cantilevered member having a transverse bar carried on its free end over which the full width of the bail handle of a lantern is supported against, it is possible to restrain the swinging motion of a lantern such as supported from a side of a boat.

Accordingly, it is an important object of the present invention to provide a support apparatus for a lantern and the like which maintains the lantern in a substantially upright position notwithstanding the rocking or other movement of the boat.

Another important object of the present invention is to provide a support apparatus for a lantern and the like which maintains the lantern in such a position that substantially all of the fuel in the fuel tank is allowed to be burned.

Another important object of the present invention is to provide a support apparatus for a lantern and the like wherein the lantern is maintained in a substantially rigid position except for pivotal movement of the lantern about its bail handle.

Another important object of the present invention is to provide a support apparatus for a lantern and the like which may be utilized to support a lantern from a side of a boat which provides a minimum of change of the illuminated water surface as the boat rocks or moves in the water.

SUMMARY OF THE INVENTION

It has been found that a suitable support apparatus for holding a lantern and the like may be constructed of a pair of elongated members having end portions connected together by a pivot joint. One of the elongated members is provided with attachment means for attaching the support apparatus to a supporting structure. The other elongated member is carried in a cantilevered manner with respect to the attached elongated member having a raised medial portion with notches formed therein for receiving a bail handle of a lantern and a transverse bar member carried on the free end of the cantilevered elongated member over which the full width of the bail handle bears against. It has been found that such a construction provides stability in supporting a lantern and that movement of the lantern is constrained by the supporting apparatus to pivoting of the lantern about its bail handle. When the support apparatus is utilized to support a lantern from a side of a boat, as the boat rocks backwards and forth in the water the lantern pivots about its bail handle so as to be maintained in a substantially upright position while only its height above the water changes slightly but not its inclination thereto.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
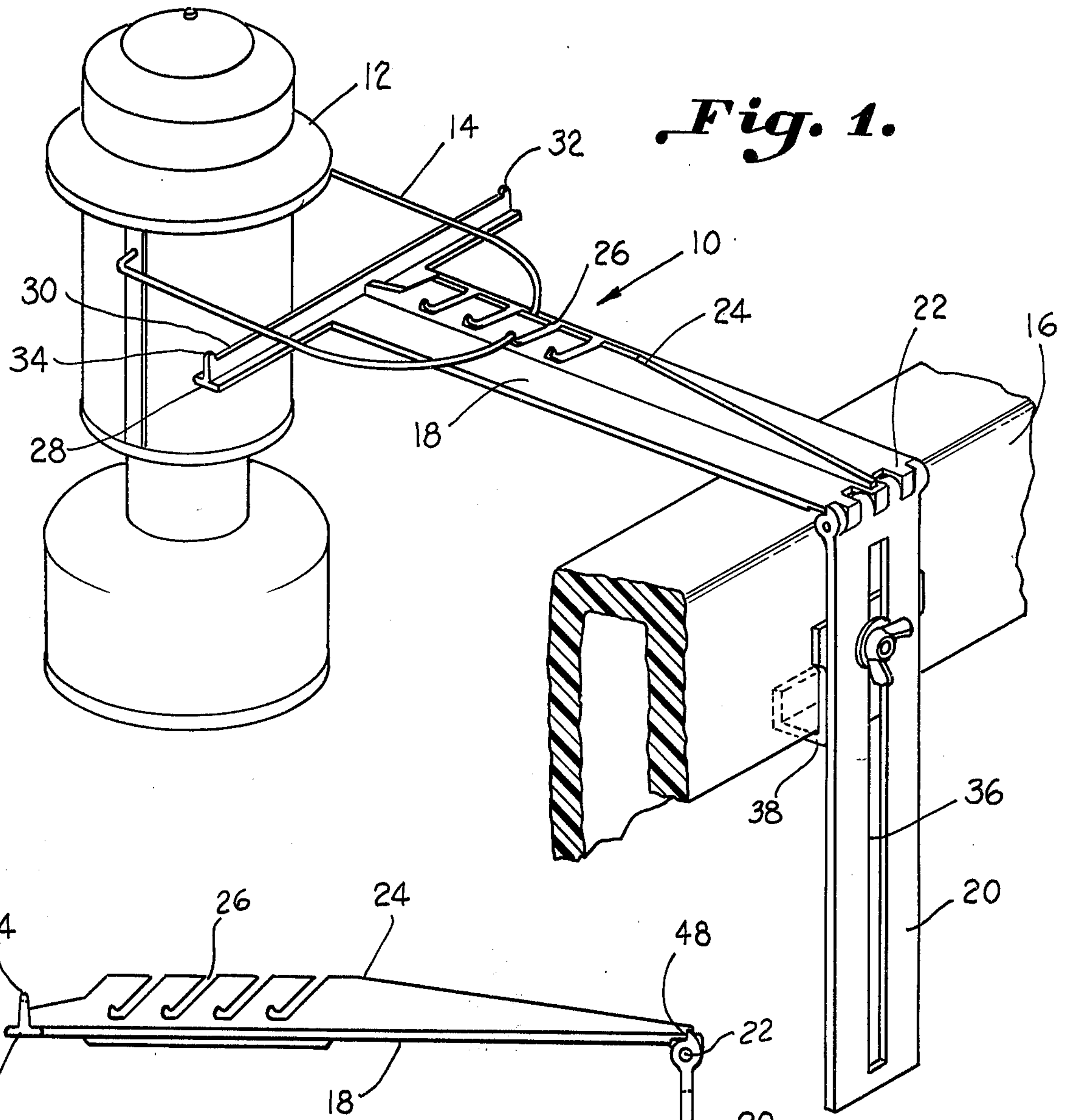
FIG. 1 is a perspective view illustrating a support apparatus constructed in accordance with the present invention for supporting a lantern thereon in spaced relationship to a supporting structure such as a side of a boat.
Figure 2:
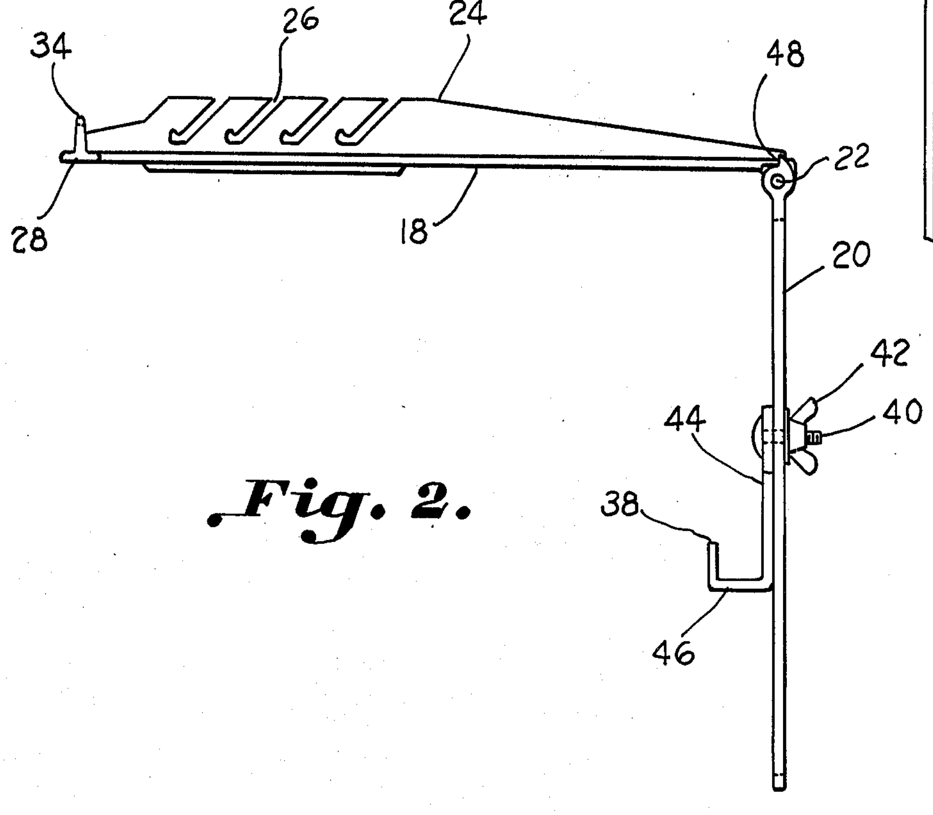
FIG. 2 is a side elevational view of a lantern support apparatus constructed in accordance with the present invention.

The drawing illustrates a support apparatus for holding a lantern having a pivotable bail handle including a pair of elongated members having end portions connected together by a pivot joint. A raised medial portion is provided on a first of the elongated members having at least one transverse notch formed therein for receiving the bail handle. An elongated transverse member is carried on an end of said first elongated member remote from the pivot joint for receiving the width of the bail handle thereagainst. An attachment means is carried by a second of the elongated members for attaching the support apparatus to a supporting structure. Thus, the bail handle is received in the notch and overagainst the elongated transverse member to maintain the lantern in an upright position as it freely pivots about its bail handle while supported thereby.

FIG. 1 illustrates a lantern support apparatus, designated generally at 10, for holding a lantern 12 having a pivotable bail handle 14. The lantern support apparatus is attached to a suitable supporting structure such as an upper edge 16 of a side of a boat. The lantern support 10 is preferably constructed of a reinforced plastic material providing high durability which is not susceptible to rusting and will not scratch the finish on the boat.

The lantern support apparatus 10 includes a pair of elongated members 18 and 20 having end portions connected together by a pivot joint 22. A raised medial portion 24 is formed on the elongated member 18 having a plurality of inclined transverse notches 26 provided therein for receiving the bail handle 14 of the lantern. An elongated transverse bar member 28 extends across an end of the elongated member 18 remote from the pivot joint 22 for receiving the full width of the bail handle 14 thereagainst. The transverse bar member 28 is preferably constructed as one piece with the elongated member 18 and includes a raised longitudinal vertical member 30 against which the bail handle 14 rests. A pair of upwardly extending projections 32 and 34 extend past the raised vertical portion 30 to prevent the bail handle 14 from sliding off of the transverse bar member 28.

Attachment means is provided on the elongated member 20 for attaching the support apparatus 10 to a supporting structure such as the upper edge or gunwale 16 of a boat. The attachment means includes a longitudinal slot 36 formed in the elongated member 20 and an adjustable bracket member 38 having an aperature formed therein through which a suitable fastening member 40 extends therethrough and through the longitudinal slot 36. A wingnut 42 is received over a threaded end of the fastening member 40 for securing the bracket member 38 to the elongated member 20 at a desired position. The adjustable bracket member 38 includes a first leg 44 parallel and adjacent to the elongated member 20 and a second leg 46 extending outwardly from the first leg 44 and away from the elongated member 20. The aperature for receiving the fastening member 40 is formed in the first leg 44.

When attached to the upper edge of a side of the boat, the lantern support apparatus 10 is clamped between the elongated member 18 and the second leg 46 of the bracket member and then the bracket member is fastened to the elongated member 20 by tightening the wingnut 42. The bracket member 38 may be adjusted in the longitudinal slot 36 to accommodate attachment of the support apparatus 10 to a variety of side supporting structures of boats and the like. When the lantern support apparatus 10 is not being used, the elongated member 20 may be pivoted clockwise toward the elongated member 18 and the adjustable bracket member 38 may be slid to the lowermost end of the longitudinal slot 36 and received over the transverse bar 28 in a folded position and secured thereto providing a compact, flat configuration for storage.

An abutment member 48 is provided on the hinge joint portion of elongated member 20 for abutting the hinged end of elongated member 18 so that the elongated members 18 and 20 open into a ninety degree configuration for placement over the side of the boat.

Figure 3:
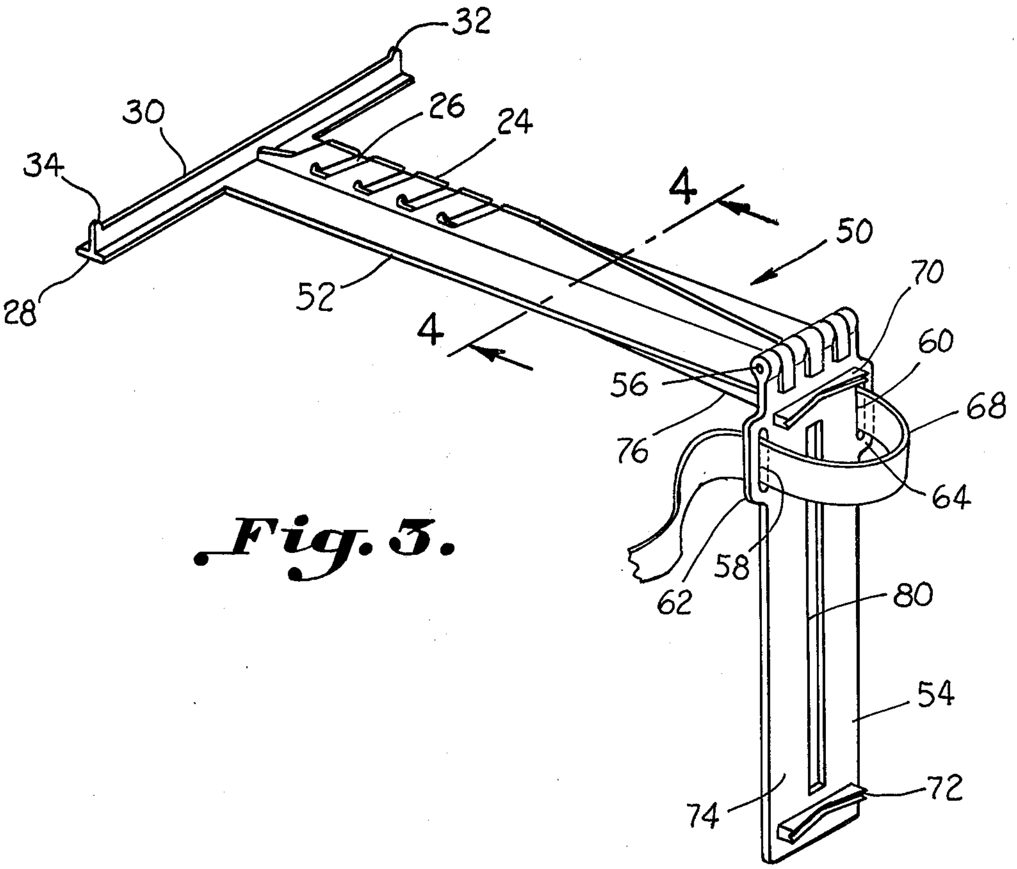
FIG. 3 is a perspective view of an alternate embodiment of a lantern support apparatus constructed in accordance with the present invention.
Figure 5:
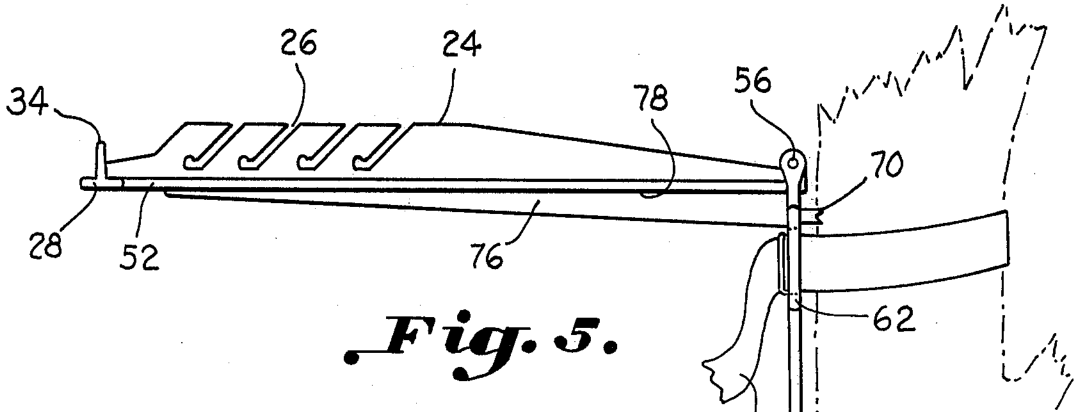
FIG. 5 is a side elevational view of the lantern support apparatus shown in FIG. 3.
Figure 5:
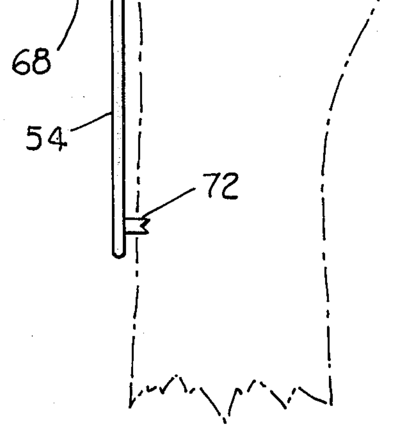
Figure 4:
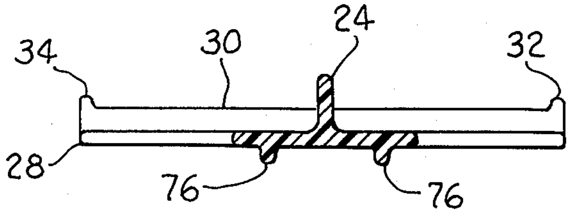
FIG. 4 is a sectional view taken along line 4—4 of FIG. 3.

FIG. 3 illustrates an alternate embodiment of a lantern support apparatus constructed in accordance with the present invention wherein a support apparatus may be attached to a supporting structure such as a post or tree. The support apparatus, designated generally at 50 includes a pair of elongated members 52 and 54 having end portions connected together by a pivot joint 56. The elongated member 52 is provided with a raised medial portion 24 having notches 26 formed therein for receiving the bail handle 14 of the lantern in the same manner as shown in FIG. 1. The elongated member 52 also includes a transverse bar member 28 formed as one piece therewith which is identical to the transverse bar shown in FIG. 1.

An attachment means is provided on the elongated member 54 and includes a pair of spaced slots 58 and 60 formed in laterally extended ears 62 and 64, respectively, of the elongated member 54, and a flexible fastening member 68 received through the slots to be wrapped around a supporting structure such as a post or tree, but not limited thereto. The fastening member 68 may be a flexible strap and may include a conventional buckle on one end for tightening the flexible strap about the supporting structure.

A pair of spaced cradle members 70 and 72 are formed on a back side 74 of the elongated member 54 to brace the elongated member against the supporting structure when the flexible fastening member 68 is tightened around the periphery of the supporting structure. The cradle members 70 and 72 preferably are concave inwardly so as to form a cradle for the supporting structure particularly when the elongated member 54 is tightened around a curved surface such as a post or tree preventing the elongated member so tightened from slipping or twisting endwise relative to the supporting structure.

The elongated member 52 includes an abutment member 76 formed on a bottom surface 78 thereof. The abutment member 76 abuts the elongated member 54 attached to the supporting structure providing a cantilevered configuration for the elongated member 52 extending outwardly from the elongated member 54 and the supporting structure. Therefore, a lantern whose bail handle 14 is received in one of the notches 26 and over and against the transverse bar member 28, is supported in a substantially upright position extended away from the supporting structure. When it is desired to store the lantern support apparatus 50, the elongated member 54 may be rotated counterclockwise and a longitudinal slot 80 formed in the elongated member 54 may be received over the raised medial portion 24 so that the support apparatus is folded flat for storage.

Thus, it can be seen that a highly effective and durable lantern support apparatus is provided for supporting a lantern in a substantially upright position notwithstanding movement of the supporting structure so that substantially all the fuel in the fuel tank may be burned. the apparatus of the present invention provides a very stable lantern support apparatus wherein the lantern so supported is restricted to pivotal movement about its handle. Therefore, the surface which is illuminated by the lantern remains substantially unchanged in spite of movement of the lantern as even when the supporting, such as a boat side, moves or rocks the lantern will pivot about its handle so as to maintain itself in a substantially upright position and only its height above the illuminated surface will change slightly. Stability is afforded by the transverse bar 28 across which the full width of the bail handle of the lantern is supported thus preventing rocking or swinging of the lantern. With the bail handle received in the notch 26 and over against the transverse bar 30, the lantern will be in a highly secured position reducing the possibility that the lantern may become dislodged from the support apparatus.

While a preferred embodiment of the invention has been described using specific terms, such description is for illustrative purposes only, and it is to be understood that changes and variations may be made without departing from the spirit or scope of the following claims.

What is claimed is:

1. A support apparatus for holding a lantern having a pivotable bail handle comprising:

a pair of elongated members having end portions connected together by a pivot joint;

a raised medial portion provided on a first of said elongated members having at least one transverse notch formed therein for receiving said bail handle;

an elongated transverse member carried on an end of said first elongated member remote from said pivot joint for receiving the width of said bail handle thereagainst;

attachment means carried by a second of said elongated members for attaching said support apparatus to a supporting structure;

whereby said bail handle is received in said notch and overagainst said elongated transverse member to maintain said lantern in an upright position as it freely pivots about its bail handle while supported thereby.

2. The apparatus of claim 1 wherein said attachment means includes:

a longitudinal slot formed in said second elongated member;

an adjustable bracket member having a first leg carried parallel and adjacent said second elongated member and a second leg extending outwardly from said first leg away from said second elongated member; and a hole formed in said first leg having a fastening member extending therethrough and through said longitudinal slot for fastening said bracket member to said second elongated member;

whereby said support apparatus is clamped between said first elongated member and said second leg of said bracket member to a supporting structure and then said bracket member is fastened to said second elongated member.

3. The apparatus of claim 1 wherein said attachment means includes:

a pair of spaced slots formed in said second elongated member; and a flexible fastening member received through said slots to be wrapped around a supporting structure.

4. The apparatus of claim 3 further including a pair of spaced cradle members carried on a backside of said second elongated members to brace said second elongated member against said supporting structure as said flexible fastening member is tightened around the periphery of said supporting structure.

5. The apparatus of claim 1 further including an abutment member carried on a bottom surface of said first elongated member to abut said second elongated member so that said first elongated member is positioned in a cantilevered configuration.

6. A support apparatus for holding a lantern having a bail pivoted thereon about a horizontal axis comprising:

a horizontal outwardly extending elongated member;

at least one transverse notch formed in an upper surface of said horizontal member extending downwardly and outwardly therein;

an elongated transverse member carried on an outer end of said elongated member for receiving the width of said bail thereagainst;

attachment means carried by said elongated member for attaching said support apparatus to a supporting structure;

whereby said bail is received in said notch and overagainst said elongated transverse member to maintain said lantern in an upright position as it freely pivots about its bail while supported thereby.

* * * * *